United States Patent [19]

Tomczak et al.

[11] 4,058,888

[45] Nov. 22, 1977

[54] METHOD OF CALIBRATING VARIABLE INDUCTANCE TRANSDUCERS

[75] Inventors: Lawrence William Tomczak, Sterling Heights; Frederick William Crall, Farmington; LaVerne Andrew Caron, Sterling Heights; Walter Joseph Campau, Grosse Pointe Woods, all of Mich.

[73] Assignee: Chrysler Corporation, Highland Park, Mich.

[21] Appl. No.: 765,038

[22] Filed: Feb. 2, 1977

Related U.S. Application Data

[62] Division of Ser. No. 665,999, March 11, 1976, which is a division of Ser. No. 559,204, March 17, 1975, Pat. No. 4,024,483.

[51] Int. Cl.$^2$ ............................................. H01F 41/00
[52] U.S. Cl. .......................................... 29/593; 29/606
[58] Field of Search .................... 29/606, 602, 593; 335/260, 278; 336/30, 136

[56] References Cited

U.S. PATENT DOCUMENTS

| | | | |
|---|---|---|---|
| 3,308,411 | 3/1967 | Rushala | 336/30 |
| 3,908,264 | 9/1975 | Friberg et al. | 29/593 |

Primary Examiner—Carl E. Hall
Attorney, Agent, or Firm—Baldwin & Newtson

[57] ABSTRACT

A variable inductance transducer for providing, via inductance modulation, an electrical output signal which is representative of a mechanical input signal. The transducer comprises a cylindrical plastic bobbin on which an inductive coil is wound. A pair of electrical terminal receiving sockets for a pair of electrical terminals are formed at one end of the bobbin and a pair of electrical terminals are disposed therein. The ends of the wire forming the coil are soldered to the terminals. A protective enclosure is molded around the coil and the portions of the terminals received in the sockets to enclose the coil and lock the terminals in place in the sockets. A ferrite core is slidably arranged within a central axial bore in the bobbin to vary the inductance of the transducer in accordance with the axial portion of the core. The core is selectively positioned by means of an actuating mechanism including a flexible actuating member and in one disclosed embodiment the actuating mechanism is a vacuum servo while in another disclosed embodiment, it is a formed wire rod. The transducer is of reasonable cost and possesses accuracy, repeatability and response which makes its usage in an engine spark timing control system significantly advantageous.

1 Claim, 10 Drawing Figures

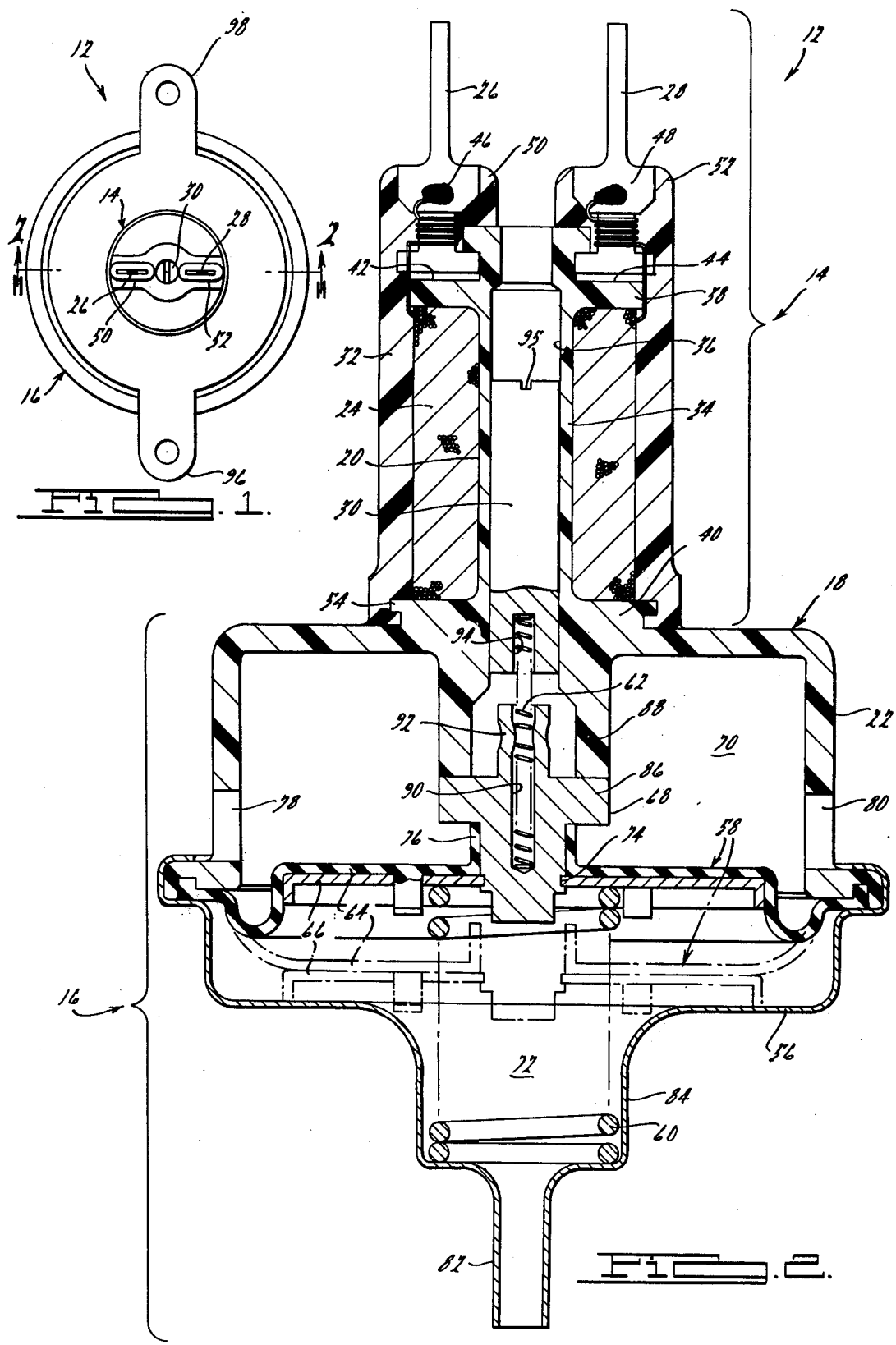

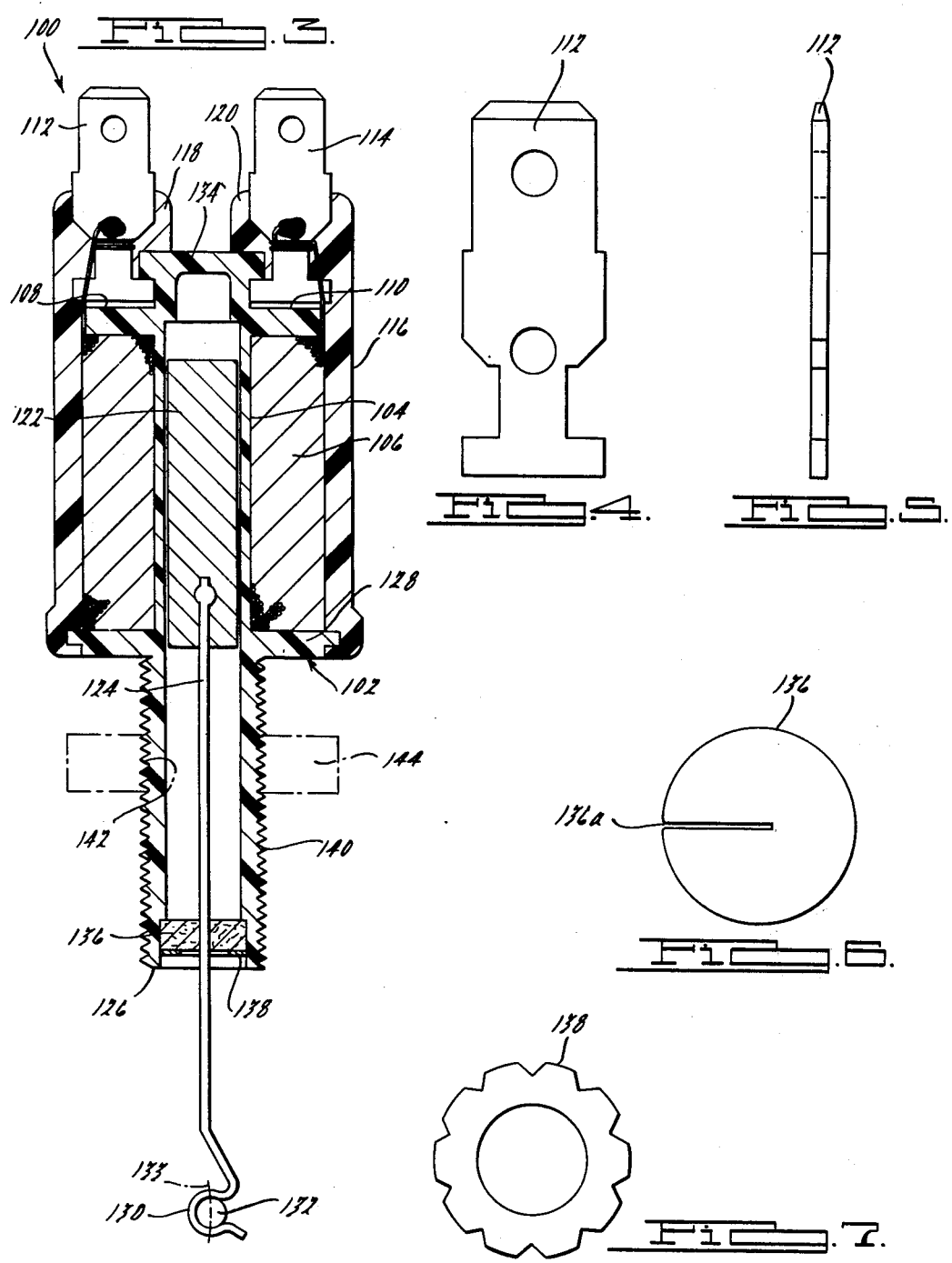

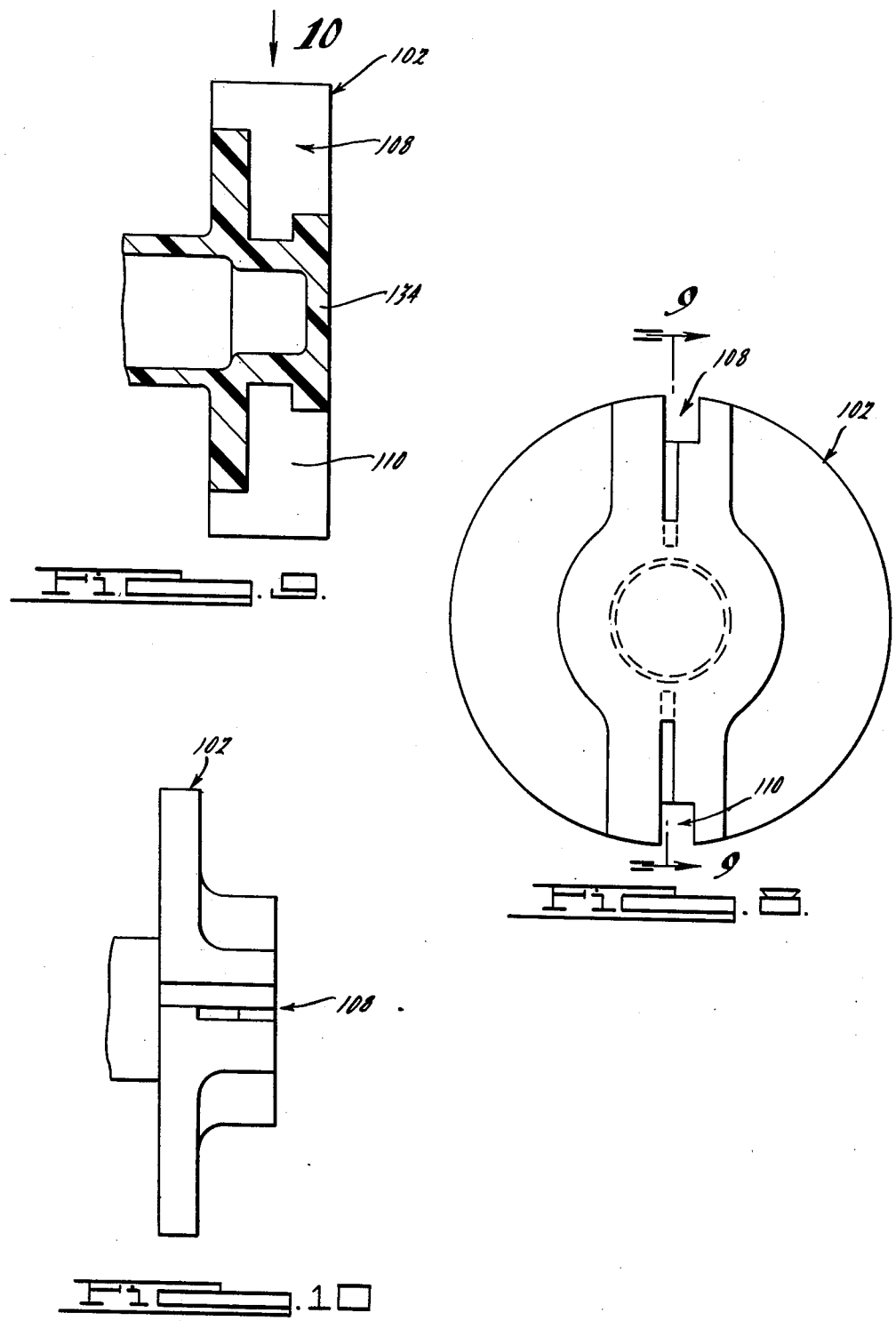

METHOD OF CALIBRATING VARIABLE INDUCTANCE TRANSDUCERS

This is a division of application Ser. No. 665,999 filed Nov. 11, 1976 which is a division of application Ser. No. 559,204 filed Mar. 17, 1975 now U.S. Pat. No. 4,024,483.

BACKGROUND AND SUMMARY OF THE INVENTION

This invention relates to a variable inductance transducer which is adapted to be connected in an electrical circuit to provide, via inductance modulation, an electrical output signal representative of a mechanical input signal.

Among the objects of the present invention are to provide an improved variable inductance transducer which: is well suited for use in an automotive engine spark timing control system; achieves a degree of accuracy, repeatability and response in such a system without imposing excessive cost penalty; is reasonably compact and rugged in construction; which can be quickly and accurately calibrated; and exhibits other advantages over prior transducers of the same general type.

These features and advantages, along with additional ones, will be seen in the ensuing description and claims which are to be taken in conjunction with the accompanying drawings.

BRIEF DESCRIPTION OF THE DRAWINGS

The drawings illustrate two presently preferred embodiments of the present invention according to the best mode contemplated in carrying out the invention.

FIG. 1 is an axial end view of a first embodiment of variable inductance transducer according to the present invention.

FIG. 2 is an enlarged longitudinal sectional view taken in the direction of arrows 2—2 in FIG. 1.

FIG. 3 is a longitudinal sectional view of a second embodiment of variable inductance transducer embodying principles of the present invention.

FIG. 4 is a plan view of one element of the transducer of FIG. 3 shown by itself.

FIG. 5 is a side view of the element of FIG. 4.

FIG. 6 is a plan view of another element of the transducer of FIG. 3 shown by itself.

FIG. 7 is a plan view of still another element of the transducer of FIG. 3 shown by itself.

FIG. 8 is an axial end view of yet another element of the transducer of FIG. 3 shown by itself.

FIG. 9 is a fragmentary sectional view taken in a direction of arrows 9—9 in FIG. 8.

FIG. 10 is a fragmentary view taken in the direction of arrow 10 in FIG. 9.

DESCRIPTION OF THE PREFERRED EMBODIMENTS

Turning first to FIGS. 1 and 2 there is shown a first embodiment of variable inductance transducer 12 embodying principles of the present invention. Transducer 12 comprises a coil section 14 and an actuating mechanism section 16. Commmon to both sections is a molded plastic element 18, which forms a bobbin 20 for transducer coil section 14 and a shell 22 which defines a portion of the actuating mechanism housing for actuating mechanism section 16. Coil section 14 comprises in addition to bobbin 20, an inductive coil 24, a pair of electrical terminals 26 and 28, a ferrite core 30 and a molded protective enclosure 32. Bobbin 20 has a tubular axial body 34 including a circular axial bore 36. A pair of annular axially spaced, imperforate end walls 38 and 40 are directed radially outwardly of body 34 to form an annular coil receiving space around the body between themselves. Coil 24 is formed by winding a length of electrically conductive coil wire around the body of the bobbin to fill the coil receiving space between the two walls 38 and 40. The upper axial end of bobbin 20 includes a pair of electrical terminal receiving sockets 42 and 44 respectively which are disposed axially beyond end wall 38 relative to coil 24. (Greater detail of the design of sockets 42 and 44 will be seen in FIGS. 8, 9 and 10). The socket engaging portions of terminals 26 and 28 are disposed in sockets 42 and 44 respectively and the end segments of the length of wire forming coil 24 are brought out and wrapped around the two terminals and then electrically joined to the terminals, for example, by soldering as shown at 46 and 48. Enclosure 32 is then molded around the bobbin to enclose coil 24 and to lock terminals 26 and 28 in their respective sockets 46 and 48. The enclosure 32 is also molded in the shape of a protuberance 50 around the portion of terminal 26 immediately adjacent socket 42 and a similar proturberance 52 around the portion of terminal 28 immediately adjacent socket 44. It is desirable to mold both element 18 and enclosure 32 from the same material; for example glass-filled nylon is a suitable material. End wall 40 is provided with a radially outwardly directed, circumferentially extending lip 54 and the lower end of enclosure 32 is molded around lip 54 to interlock therewith. Enclosure 32 thus serves to protectively enclose coil 24 and to securely hold terminals 26 and 28 in place, along with protecting the solder joints at which the wires forming coil 24 are joined to terminals. Ferrite core 30 is designed in the form of a circular cylinder to fit snugly within bore 36 for axial sliding movement. By selectively positioning core 30 axially within bore 36, the inductance appearing between terminals 26 and 28 is caused to vary as a function of the axial position of the core.

Turning now to the details of actuating mechanism section 16, the reader will observe that this section in addition to shell 22 comprises a second shell 56, a diaphragm assembly 58, a helical coil spring 60 and a connecting element 62. Diaphragm assembly 58 comprises a resilient annular diaphragm 64, an annular metal support plate 66 and a central diaphragm pin 68. The outer periphery of diaphragm 64 is securely anchored and sealed between the peripheries of shells 22 and 56 so that the actuating mechanism section 16 is divided into an atmospheric chamber 70 and a vacuum chamber 72. Diaphragm pin 68 is staked to support plate 66 as at 74 and the inner periphery of diaphragm 64 is formed to an axially projecting sealing lip 76 which seals against the central outer periphery of pin 68. Atmospheric chamber 70 is communicated to atmosphere by means of suitable diametrically opposed openings 78 and 80 formed in shell 22. Vacuum chamber 72 is adapted to be communicated to a source of vacuum by means of a tubular nipple 82 centrally formed at the lower end of shell 56. Spring 60 is lodged in a suitable seat 84 formed in shell 56 and bears against plate 66 so as to bias diaphragm assembly 58 axially upwardly as viewed in FIG. 2 so that the shoulder 86 on pin 66 abuts the lower end of a tubular projection 88 which is fashioned in element 18 within chamber 70.

One aspect of the present invention relates to providing connecting element 62 with a certain flexibility in the connection between core 30 and pin 68 which is beneficial in at least several respects. First, because of its flexibility, axial alignment between core 30 and pin 68 is made less critical than if a rigid connection were used. Thus tolerances in the individual parts can be less stringent thereby yielding savings in transducer cost. By using an elongated, tightly wound helical coil (preferably made of phosphor bronze or beryllium copper) for connecting element 62 as disclosed in the drawing, adequate flexibility is atained even though the distance between the points of attachment of the connecting element is relatively short. A second advantage of using a flexible connecting element is that mechanical hysteresis and deadband in the positioning of the core within the bobbin are substantially minimized, or even eliminated, and thus improved linearity is attained. Since the diameter of core 30 must be somewhat smaller than the diameter of bore 36, there will be a tendency for the core to cock within the bore if there is any misalignment of the actuating mechanism with respect to the bore. As the core is selectively positioned, this cocking creates undesirable forces between the core and the bore which give rise hysteresis, deadband etc. The flexible connection afforded by element 62 tends to minimize the effects of misalignment by reducing the severity of any cocking tendency of core 30 within bore 36. When using a vacuum servo of the type shown as an actuating mechanism, an inherent characteristic is that the servo diaphragm will tilt, or cock, as it is displaced in response to application of vacuum. Thus, there exists an inherent tendency for such a servo to cock the device which it controls. While this cocking tendency may be unimportant when the servo is used to merely open or close a valve, it definitely affects the precision of a transducer such as the present device. However, the present invention overcomes this difficulty, yielding a significant improvement.

There are several possible ways to attach connecting element 62 to core 30 and to pin 68. When pin 68 is made of a deformable metal such as aluminum, the connecting member may be mechanically crimped to the pin by inserting the member into a central axial bore 90 in the pin and then mechanically deforming the pin as at 92. Where pin 68 is made of a plastic material, the connecting member may be inserted into the bore and attached by ultrasonic welding. Connecting member 62 can be inserted into an axial bore 94 in core 30 and cemented in place with a suitable cement. An especially desirable technique is to automatically calibrate the transducer during assembly. This can be done in several possible ways. One way of calibrating the transducer is to first affix element 62 to core 30 before the element is attached to pin 68. With the transducer axis horizontal, sufficient vacuum is drawn in vacuum chamber 72 to displace the diaphragm assembly to the broken line position shown in FIG. 2. Terminals 26 and 28 are connected in a calibration circuit which monitors the inductance of the transducer. With connecting member 62 secured thereto, core 30 is positioned axially within bore 36 until the desired inductance reading is taken on the equipment which is connected to the transducer terminals. Because bore 36 extends completely through the bobbin core, it is acceptable for axial positioning by means of a tool inserted into the open upper end of the bore. The tool should be of a non-magnetic material so as not to affect the inductance of the transducer. As core 30 is selectively positioned, connecting member 62 is being positioned within bore 90 with respect to pin 68.

When the correct adjustment has been made, the upper end of pin 68 is crimped by inserting appropriate crimping mechanism via openings 78 and 80 to mechanically deform the upper end of pin 68 and thereby secure connecting element 62 thereto. Another way to calibrate the transducer is to thread bore 94 so that core 30 may be axially adjusted with respect to connecting member 62. Alternatively bore 90 could be threaded. Once again access for adjusting core 30 may be via the open upper end of bore 36 and therefore, the upper end of core 30 is preferably shaped as at 95 to receive an adjustment tool.

The operation of transducer 12 is as follows. Terminals 26 and 28 are electrically connected with an electrical circuit which provides an output signal which is a function of the inductance provided by transducer 12. An example of such a circuit is shown in U.S. patent application of the same inventors entitled "Transducer Circuits" filed at even date herewith and assigned to the same assignee as the present application. Nipple 82 is connected to a source of vacuum; for example, the intake manifold vacuum in an automobile engine. As vacuum is applied to vacuum chamber 72, there will be created a pressure differential across diaphragm assembly 58 tending to displace the diaphragm assembly axially downwardly against the upward force exerted by spring 60. The amount of downward displacement of the diaphragm assembly will be progressively increased as the pressure differential across the diaphragm progressively increases. Maximum downward displacement of the diaphragm assembly will be limited by abutment of the downturned peripheral flange of plate 66 against the radial wall of shell 56 as shown in broken lines in FIG. 2. As the diaphragm assembly is selectively positioned in accordance with the degree of vacuum (relative to atmosphere) core 30 similarly selectively positioned within bore 36. In turn, this causes the inductance appearing between terminals 26 and 28 to be selectively varied. Thus, the inductance connected in the electric circuit with which the transducer is used is representative of the vacuum applied to vacuum chamber 72. For a given application, the dimensions and characteristics of the detailed elements of the transducer may be selected in accordance with known design formulations so that the correct ratio between the input and the output is attained. It has been found that the illustrated type of diaphragm provides good linearity and repeatability. The diaphragm should roll freely; stretching of the diaphragm is to be avoided since this will introduce hysteresis. A transducer constructed in accordance with the principles of the invention has been found to achieve overall accuracy, repeatability and response which is especially advantageous for use in an automotive engine control system such as an electronic spark timing control circuit. Moreover, the invention permits such a transducer to be constructed without imposing excessive and unreasonable expense on the system. Since the open upper end of the bore 36 is open, it is desirable to mount the transducer so that this end is protected from any contaminants such as dirt and dust. One way of mounting the transducer is in a housing which mounts on the engine air filter housing, the axis of the transducer being generally horizontal. Nipple 82 is exposed to be readily connected by means of a vacuum hose with the engine intake manifold. A pair of mounting tabs 96 and 98 (FIG. 1) are provided for mounting the transducer in its mounting housing on the air filter housing.

FIG. 3 discloses a second embodiment of a transducer 100 according to principles of the present invention. Transducer 100 comprises a molded plastic element 102 which forms a bobbin 104 on which a length of conductive wire is wound to form an inductive coil 106. The upper end of element 102 includes a pair of terminal receiving sockets 108, 110 in which a pair of electrical terminals 112, 114 are received. The ends of the wire forming coil 106 are soldered to terminals 112, 114 and the assembly is covered by a protective enclosure 116 including protuberances 118, 120 around the terminals. A cylindrical ferrite core 122 is axially positioned within the central axial bore of bobbin 104 and is actuated by a formed wire rod 124 secured to the lower axial end thereof. Element 102 is further provided with a tubular extension 126 extending centrally axially downwardly from the lower end wall 128 of bobbin 104. Extension 126 defines a continuation of the bobbin bore with rod 124 extending therethrough. The lower end of rod 124 is formed into a shepherd's crook 130 which may be conveniently snapped onto a cylindrical member 132. The upper end of the central bore is closed off by appropriately molding a closure 134 into element 102. The open lower end of the bore is counterbored and protectively closed by a felt washer 136 retained within the counterbore by a metal retaining washer 138. End views of washers 136 and 138 are shown in FIGS. 6 and 7, respectively. Washer 136 includes a thin radial slit 136a which permits the washer to be readily slid onto the formed wire rod 124. Washer 138 includes a sufficiently large circular hole to be slid over the shepherd's crook 130, yet smaller than the diameter of core 122. The outer periphery of washer 138 is serrated and is sized such that the washer forcibly embeds in the counterbore to retain washer 136 and also to prevent core 122 from falling out of the bore. This arrangement protects the transducer bore from contaminants, retains the core, and permits free sliding movement of wire rod 124 therethrough. The outside diameter of extension 126 is threaded as indicated at 140 to permit the transducer to be threadably mounted in a threaded hole 142 in a mounting member 144. Assuming that members 132 and 144 are relatively movable in the axial direction, the transducer may be accurately calibrated by threading extension 126 a desired amount with respect to member 144. For a given dimension between members 132 and 144, the axial adjustment of extension 126 relative to member 144 will axially position coil 106 relative to core 122. With terminals 112, 114 connected in an appropriate electric circuit, the circuit response may be observed as the transducer is axially adjusted, thus permitting the transducer to be quickly and accurately calibrated. Once the desired adjustment has been attained, a jam nut (not shown) may be used to lock the transducer in place.

Like the helically coiled connecting member 62 of the first embodiment, wire rod 124 is of sufficiently small diameter to provide a certain flexibility in the connection between member 132 and core 122. This is important because in usage of the transducer it is contemplated that member 132 may swing along a slight arc 133 whereby there will be inherent tendency for misalignment between the axis of the transducer bore and the actuating member.

FIGS. 4 and 5 illustrate details of terminals 112, 114 and FIGS. 8, 9 and 10, details of sockets 108, 110. By way of example the transducer coils may have 3000 turns of No. 32 wire to provide in cooperation with the ferrite core available inductance of about 40-170 millihenrys.

What is claimed is:

1. A method of calibrating a vacuum-servo-actuated variable inductance transducer during assembly thereof, said transducer being of the type comprising a vacuum servo having a diaphragm which is positionable according to the intensity of a vacuum signal applied to the servo, an inductance coil, a core movable axially of the coil to vary the inductance thereof, and a pair of telescopically engaged connecting members, one of which is affixed to the core and the other of which is affixed to the diaphragm, said method comprising:

providing said servo, core, and coil in assembled relationship but with said two telescopically engaged connecting members relatively movable with respect to each other so that their mutual telescopic engagement may be set to a desired amount;

providing tool access opening means in said servo;

providing a given vacuum signal to the servo;

positioning the core relative to the diaphragm, and in so doing setting the amount of telescopic engagement of said two connecting members, to obtain a desired inductance of the coil for the given vacuum signal;

and inserting assembly tool means through said access opening means and uniting the two connecting members in fixed telescopic engagement with each other by means of said tool means.

* * * * *